June 6, 1950     J. HUCK     2,510,340

BRAKE DEVICE FOR SCAFFOLD MACHINES

Filed April 3, 1948     2 Sheets-Sheet 1

INVENTOR.
Joseph Huck
BY C. P. Goepel
his ATTORNEY

June 6, 1950     J. HUCK     2,510,340
BRAKE DEVICE FOR SCAFFOLD MACHINES
Filed April 3, 1948     2 Sheets-Sheet 2
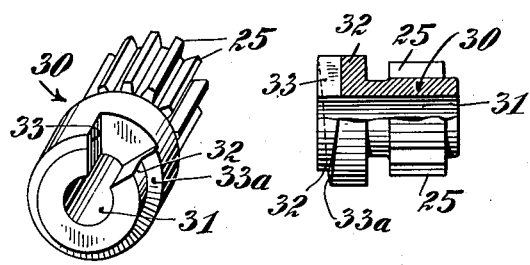
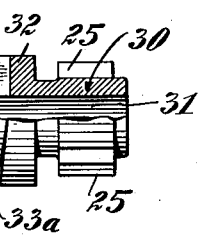
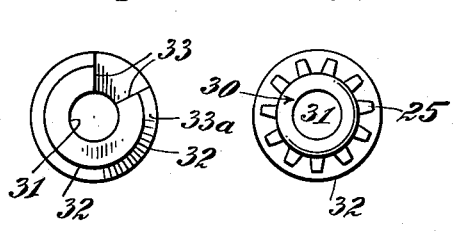
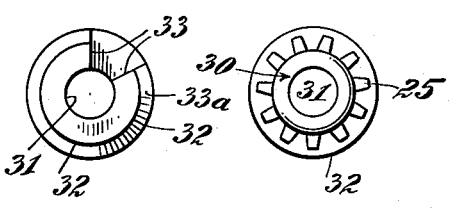
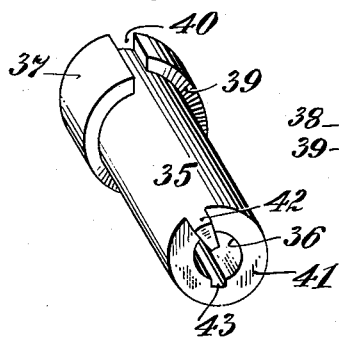
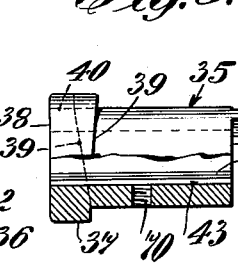
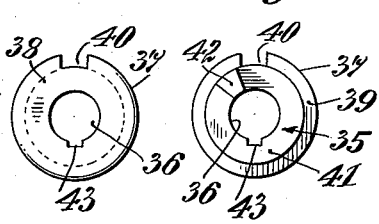
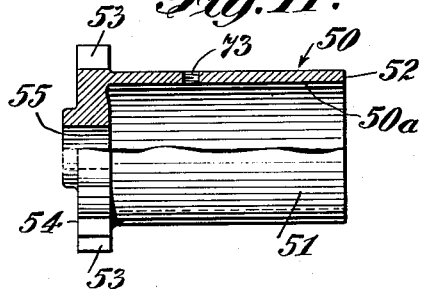
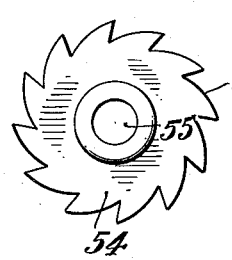
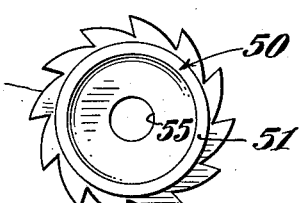
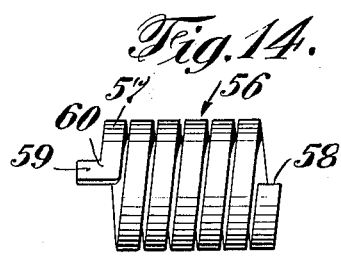
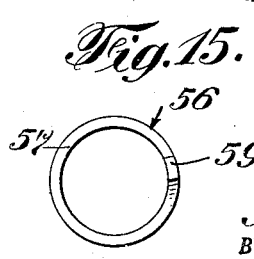
INVENTOR.
Joseph Huck
BY C. P. Goepel
his ATTORNEY Patented June 6, 1950

2,510,340

UNITED STATES PATENT OFFICE 2,510,340

BRAKE DEVICE FOR SCAFFOLD MACHINES

Joseph Huck, Tenafly, N. J., assignor to The Patent Scaffolding Co., Inc., Long Island City, N. Y., a corporation of New York Application April 3, 1948, Serial No. 18,766

1 Claim. (Cl. 192—16)

This invention relates to scaffold machines and more particularly to a brake used in such a machine.

The object of the invention is to obtain enhanced security in the operation of such machines, always attendant with the danger of giving under the weight applied.

The invention consists of a combination of a brake device with a scaffold machine frame, the brake device being located within the frame on the driving shaft and set into operation to perform its braking function when load is applied to the winding drum, when the handle is not under control.

The brake device is so organized in cooperation with the structure of a suspended scaffold machine that the machine may be readily raised or lowered, and in the event, that an undesired descent is probable, that descent is inhibited by the action of the brake device.

The invention will be further described, an embodiment thereof shown in the drawings and the invention will be finally pointed out in the claim.

In the accompanying drawings,

Fig. 3 is a prospective view of the pinion member;

Fig. 4 is a partial central longitudinal section of Fig. 3;

Fig. 5 is one end view of Fig. 4;

Fig. 6 is the other end view of Fig. 4;

Fig. 7 is a perspective view of the cylindrical spring holding member;

Fig. 8 is a partial central longitudinal section of Fig. 7;

Fig. 9 is one end view of Fig. 8;

Fig. 10 is another end view of Fig. 8;

Fig. 11 is a partial central longitudinal section of the brake drum;

Fig. 12 is one end view of Fig. 11;

Fig. 13 is the other end view of Fig. 11;

Fig. 14 is a side view of the spring;

Fig. 15 is an end view of the same;

Fig. 16 is a side view of one side of the detached handle, and

Fig. 17 is a view of the other side of the detached handle.

Similar characters of reference indicate corresponding parts throughout the various views.

Figure 1:
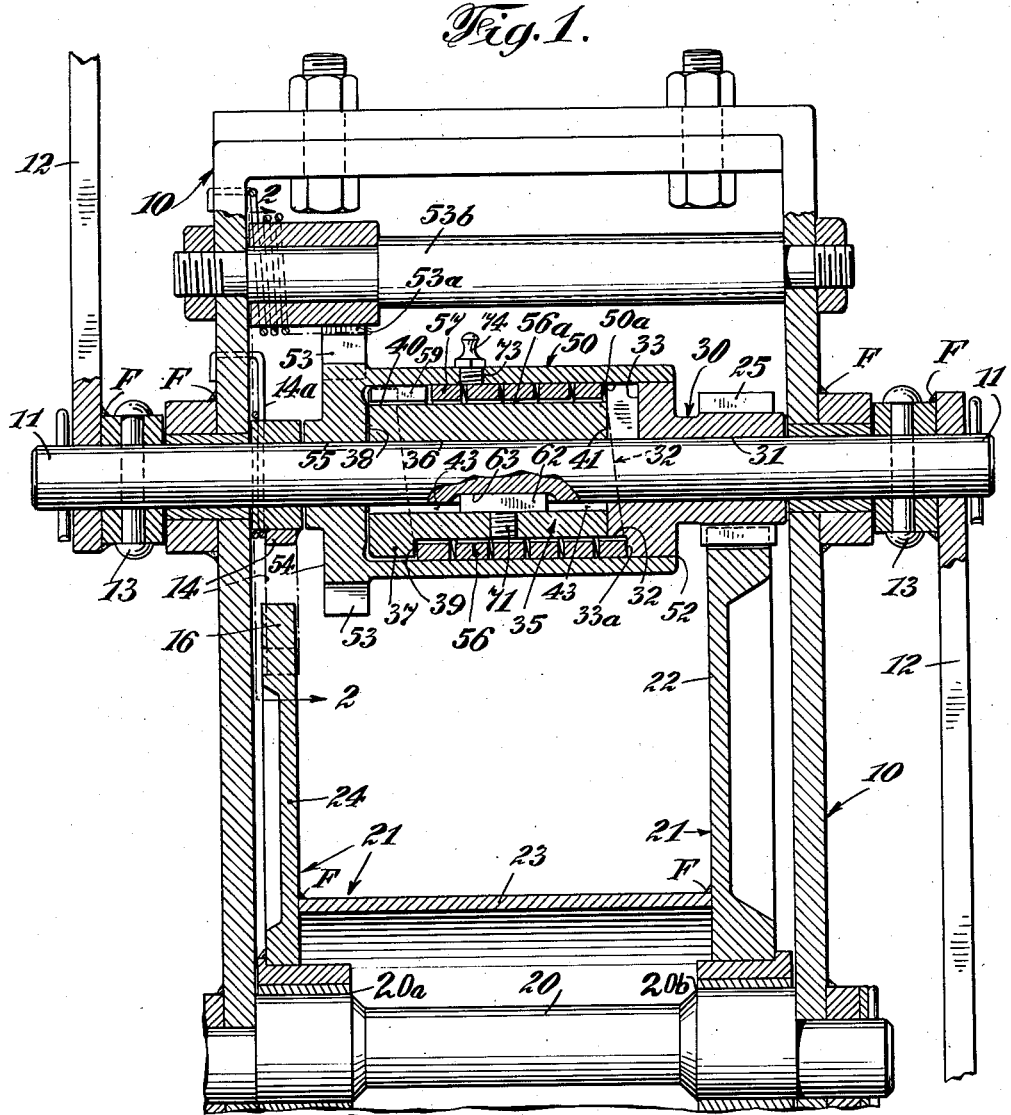
Fig. 1 is a section of the upper part of a known scaffolding hoist, with the improvement embodied therein.

Referring to the drawings, the frame 10 has a shaft 11 having a pin 13 engaged by a slot 12a of the handle 12. On the shaft 11 is mounted a pawl 14 controlled by a spring 14a, controlled in turn by a handle 15, which pawl 14 engages a ratchet 16 on a shaft 20 supported in the frame 10. The ratchet 16 forms a part of a drum 21, the other side of which has a gear 22 mounted on the shaft 20 to rotate therewith. A cylindrical sleeve 23 connects a disk 24 having the ratchet 16 with the gear 22, and provides space for the wound cable. The gear 22 meshes with a pinion 25 on the shaft 11. On the clockwise movement of the handle 12, the shaft 11 is rotated and the cable is wound, the pawl 14 riding loosely on the ratchet 16. These parts are known, excepting the particular pinion 25.

The improvement consists in combining with the shaft 11 of a scaffold machine frame 10, a load brake for the purpose of adding greater security in the use of the scaffold machine.

This load brake consists of a novel pinion gear sleeve 30, having a bore 31 for the passage of the shaft 11, and having integrally at one end of the pinion 25, a helical portion 32, with segmental cutout 33, and a shoulder 33a, (Figs. 3, 4, 5 and 6) the bore 31 extending through the helical portion 32.

Adjacent to this helical portion 32 is a cylindrical member 35 having a bore 36 to fit over the shaft 11, and having at one end a collar 37 with one side 38 at the end of the member 35 in a plane at right angles to the axis of the shaft 11. The other side 39 of the collar is of helical contour. The collar 37 has a cutout 40 forming a space between two adjacent ends of the collar 37. The other end of the member 35 has a flat surface 41 at right angles to the axis of the shaft 11, and has a projection 42 of segmental or pie shape. A key way 43 is provided axially of the bore 36. (Figs. 7, 8, 9 and 10.)

Figure 2:
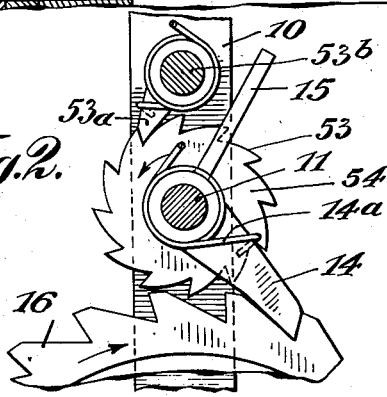
Fig. 2 is a side view of the parts of Fig. 1, taken on line 2—2 of Fig. 1 in the direction of the arrows.

A brake drum 50 consists of a hollow sleeve 51, open at one end 52, and having a ratchet 53 at its other end on a closing wall 54, having a bore 55 for the shaft 11 (Figs. 11, 12 and 13). The ratchet 53 is engaged by a spring actuated pawl 53a on a shaft 53b supported by the frame 10. (Fig. 2.)

The brake spring 56 (Figs. 14 and 15) consists of a cylindrically wound band 57 with one end 58, cut off to form a surface radially disposed to the axis of the cylindrical band 57, with the other end 59, bent at right angles as to 60, to form a projecting end disposed axially and in the convolution of the spring. The convolutions are spaced slightly apart. As the outer diameter of the cylindrical member 35 is less than the bore 50a of the drum 50, and less than the bore of the convolutions of the spring 56, a longitudinal space 56a is formed. The end 58 of the spring extends over the helical end of the member 30. The brake spring 56 has a slightly greater outside diameter than the bore of the brake drum 50, and said spring must be compressed radially to slip into the bore 50a of the brake drum 50. The end 59 of the spring 56 extends into the space 40 of the collar 37.

A key piece 62, engages the key way 43 of the member 35, and an axial slot 63 of suitable size is disposed in the shaft 11 (Fig. 1), and is engaged by the key piece 62.

The cylindrical member 35 (Fig. 8) has a conduit 70 for a screw 71 to regulate the key piece 62.

The drum 50 (Fig. 11) has a conduit 73 with a replaceable cap 74 for lubrication.

The operation is as follows:

Handle 12 is rotated in a clockwise direction and in turn rotates part 35 thru the shaft 11. The wall of the cutout 40 in member 35 in turn presses against the end 59 of the brake spring 56. In consequence, the convolutions of the spring 56 expand radially and press against the inner surface or bore 50a of the drum 50 and thus engage the brake drum 50 and cause it also to rotate in a clockwise direction, pawl 53a riding loosely on ratchet 53 of the brake drum 50. The end 58 of the brake spring 56 is forced against the shoulder 33a of the pinion gear sleeve 30 which in turn rotates the pinion gear 25. The rotation of the pinion gear 25 drives the gear 22, thus winding the cable on the sleeve 23 between parts 24 and 22.

When handle 12 is released when the pawl 14 is disengaged tension on cable tends to rotate the sleeve 23 and in turn the gear 22 in such a manner as to try to rotate the pinoin gear 25 in a counterclockwise direction. The shoulder 33a of the pinion gear sleeve 30 is then forced against the end 58 of the brake spring 56. The small initial radial compression of the brake spring 56 caused by the brake spring 56 having a slightly larger outside diameter than the inside surface of the brake drum 50 produces friction between the outside of the brake spring 56 and inside surface of the brake drum 50. This initial friction holds the brake spring 56 from slipping on the inside surface of the brake drum 50. As the force on shoulder 33a from the end 58 of the brake spring 56 increases, the resulting convolutions of the brake spring 56 tend to expand the brake spring 56 radially and thus increase the friction between the outside surface of the brake spring 56 and the inside surface of the brake drum 50 and thus lock the inner surface of the brake drum 50 and the outer surface of the brake spring 56 more securely together and prevent relative motion between the two parts. The brake drum 50 is prevented from rotating counterclockwise by pawl 53a which engages ratchet 53 of the brake drum 50. Thus the above described sequence of action prevents the unwinding of cable from the scaffolding machine by the load on the cable alone and when no force is exerted on the handle.

Pawl 14 is disengaged from ratchet 16 in order that the handle 12 may be rotated in a counterclockwise direction and the shaft 11 in turn may rotate the member 35. The wall of the cutout 40 in member 35 in turn presses against the end 59 of the brake spring 56 to 60. In consequence, the convolutions of the spring 56 compress it radially. This causes the outside surface of the brake spring 56 to become partially separated from the inner surface of the brake drum 50. When such partial separation occurs the outside surface of the brake spring 56 slips on the inside surface of the brake drum 50. The end 58 of the brake spring 56 then tends to pull away from the shoulder 33a of the pinion gear sleeve 30. Tension on the cable then rotates the sleeve 23 and in turn the gear 22 in such a manner as to cause the pinion gear 25 of the pinion gear sleeve 30 to rotate in a counterclockwise direction and keep the shoulder 33a of the pinion gear sleeve 30 in contact with the end 58 of the brake spring 56. In this manner the cable is unwound from the scaffolding machine.

Projection 42 of the member 35 floats free in the segmental cutout 33 of the pinion gear sleeve 30 and does not touch the pinion gear sleeve 30 at any point. Should the brake spring 56 break or become displaced then projection 42 would come in contact with one of the sides of the cutout 33 and transmit the load of the gear 22 directly from the pinion gear sleeve 30 to the member 35 instead of thru the brake spring 56 which has been displaced. It is an additional safety feature of the brake.

In other words, when the handle 12 is turned clockwise, the shaft 11 rotates the member 35, which acting on the end 59 of the spring 56 causes the other end 58 of the spring 56, to rotate the pinion member 30, and thus the gear 25, and the gear 22 of the winding drum to wind up the cable.

The friction of the spring 56 rotates the ratchet 53, of the brake drum 50 and the ratchet 53 slips under the pawl 53a. The projection 42 of the member 35 does not do any work, since the projection 42 is a floating position in the space formed in the member 30 between the parts 32 and 33. The distance of the space between 32 and 33 is so designed to provide for this floating action. Should, however, the spring 56 break, or wear out, then the projection 42 comes into play against either surface 32 or 33.

The spring 56 is under no compression except the friction of a few convolutions, the other convolutions near the end 58 being free.

To move the handle 12 anticlockwise, the manually operated pawl 14 is disengaged from the ratchet 16, by pressing up the handle 15. The load and on gear 22, and acts on the pinion 25 rotating member 30. The end 58 is loosened from the member 30. The spring is contracted, as the member 35 is rotated, and the brake member permits the coming down of the scaffold machine.

If, however, the hand is taken off the handle 12, then the brake device comes into play. The load is on the gear 22, and it is rotated, and thus rotates pinion 25 and member 30. Ratchet 53 of the brake member 50 is engaged by the pawl 53a, and thus drum 51 is held in position against rotation. The end 58 abuts against the shoulder 33 of the member 30. An expansion of spring 56 takes place, as the shaft 11 moves the member 35, and a locking action of the spring 56 against the drum 54 takes place. This stops the descent of the scaffolding machine. The pawl 14 rides on the ratchet 16. If, however, the pawl 14 is taken out by a workman as is sometimes the case, then the brake is set into operation. The pawl 14 is, of course, an additional safety factor.

The shaft 20 has enlargements 20a which are eccentrically disposed to the ends 20b of the shaft 20, which ends rotate in bearings of the side frames 10. The eccentric arrangement permits the gear 22 to be disengaged from the pinion 25, but as this forms no part of the invention claimed, it is not described in detail. The bushing 20c, collar 20d, and the bores of the gear 22 and the ratchet disk 24, are secured to each other by a tight fit, acting as one piece.

Wherever the reference F appears, it indicates the parts are joined by suitable welding.

I wish it to be understood that I do not desire to be limited to the exact details of construction shown and described, for obvious modifications will occur to a person skilled in the art.

I claim:

In a braking device for scaffold machines of the suspended type, a scaffold machine having a cable drum having two sides with a ratchet on one side and a gear in the other side, a displaceable pawl engaging the ratchet, a pinion to engage the gear, a first shaft separate from the cable drum, and supporting the pawl and said pinion, and a handle for rotating the first shaft, the combination of a second shaft above the first shaft, a pawl on said second shaft, and a braking device surrounding said first shaft and including a sleeve having a bore of substantially the same diameter as the diameter of the first shaft and keyed thereto, said sleeve having a collar with a space at one end and a projection at the other end, a collar on said pinion having a cut-out, the cut-out being larger than the projection to provide a free play of the projection in the cut-out, a spring of a plurality of flattened convolutions having one end engaging the spaced collar of the sleeve, and having its other end adapted to engage the pinion collar, and having an interior diameter slightly larger than the diameter of the sleeve to form a cylindrical space, and an enclosing cylindrical drum having an external ratchet engaged by the pawl on the second shaft preventing its rotation in one direction, and having an internal bore of a diameter slightly smaller than the external diameter of the spring when in its normal condition, said drum being rotatably mounted on the first shaft, whereby, when the handle is rotated clockwise, the pinion collar is rotated by its end of the spring, and its pinion actuates the cable drum to raise the same, and when the handle is rotated anti-clockwise, the cable drum ratchet pawl being disengaged, the weight of the cable drum rotates the pinion collar shoulder in a direction away from its end of the spring avoiding expansion of the spring against its surrounding brake drum, and when the handle is free and the weight of the cable drum seeks to descend, said cable drum ratchet pawl being disengaged, the spring is expanded and pressed against the brake drum and locks the shaft against rotation, and when the spring is inoperative, the projection of the sleeve engages the pinion collar making a positive connection, the brake drum being held against rotation by the pawl on the second shaft, when the cable drum tends to lower.

JOSEPH HUCK.

REFERENCES CITED

The following references are of record in the file of this patent:

UNITED STATES PATENTS

| Number | Name | Date |
|---|---|---|
| 536,584 | Sedwick | Mar. 26, 1895 |
| 697,393 | Beck | Apr. 8, 1902 |
| 933,866 | Weickel et al. | Sept. 14, 1909 |
| 1,922,635 | Post | Aug. 15, 1933 |
| 2,267,037 | Mersereau | Dec. 23, 1941 |
| 2,434,480 | Anderson | Jan. 13, 1948 |